(No Model.)
W. L. HEUSER.
ROTARY SIEVE.
No. 252,217. Patented Jan. 10, 1882.
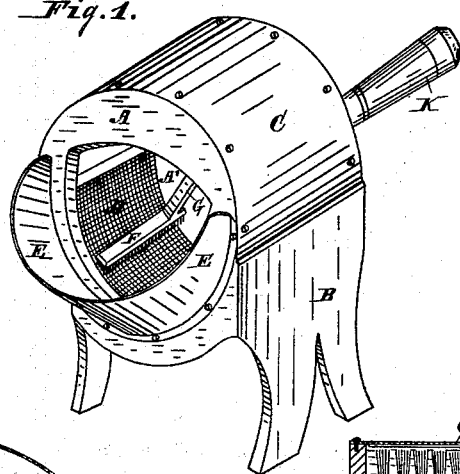
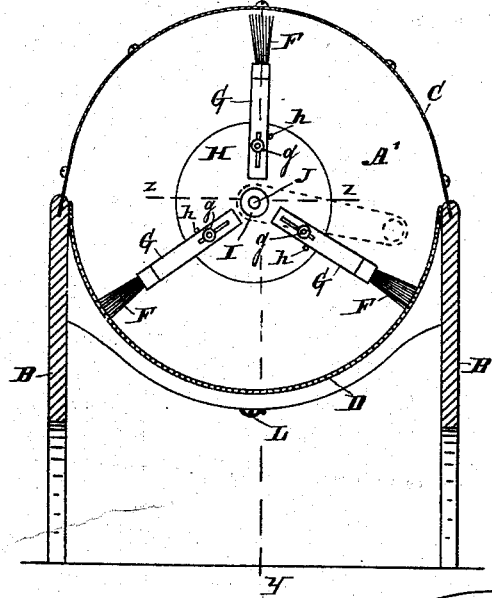
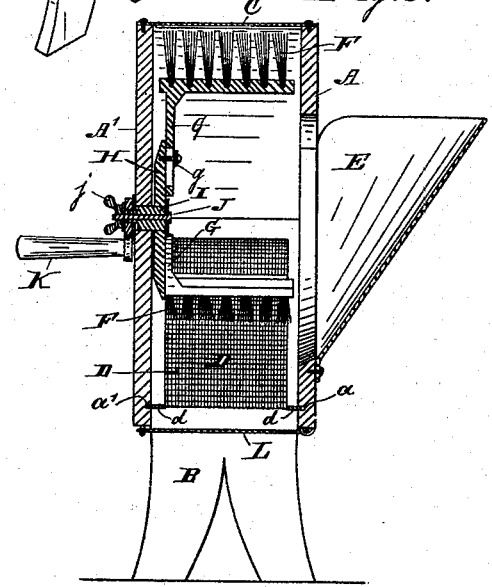
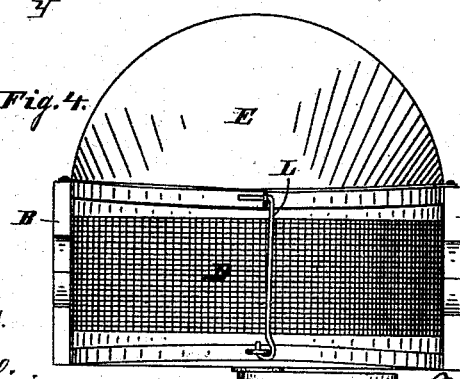
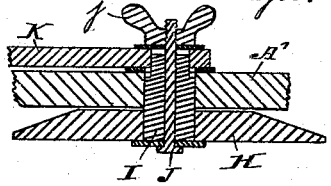
WITNESSES.
James B. Lizius.
R. P. Daggett.
INVENTOR.
William L. Heuser,
PER C. Bradford,
ATTORNEY.
N. PETERS, Photo-Lithographer, Washington, D. C.

UNITED STATES PATENT OFFICE.

WILLIAM L. HEUSER, OF INDIANAPOLIS, INDIANA.

ROTARY SIEVE.

SPECIFICATION forming part of Letters Patent No. 252,217, dated January 10, 1882.

Application filed November 14, 1881. (No model.)

*To all whom it may concern:*

Be it known that I, WILLIAM L. HEUSER, of the city of Indianapolis, county of Marion, and State of Indiana, have invented certain new and useful Improvements in Rotary Sieves, of which the following is a specification.

The object of my said invention is to produce a machine-sieve for sifting flour, meal, &c., which may be adjusted to more or less rapidly and efficiently accomplish its work; and this object is accomplished by the construction and arrangement of parts hereinafter specified, and pointed out in the claims.

Referring to the accompanying drawings, which are made a part hereof, and on which similar letters of reference indicate similar parts, Figure 1 is a perspective view of my improved sieve; Fig. 2, a vertical section; Fig. 3, a vertical section, looking to the right from the dotted line $y\,y$ in Fig. 2; Fig. 4, an under side plan; and Fig. 5, a detail sectional view of the connection of the handle with the disk carrying the brushes, on the dotted line $z\,z$ in Fig. 2, and on an enlarged scale.

In said drawings, the portions marked A A' represent the front and back sides, respectively, of the frame of my improved sieve; B B, the ends thereof; C, the top, which is preferably of tin; D, the sieve; E, a spout or hopper attached to the front A; F, revolving brushes; G, shanks to said brushes; H, a disk to which the shanks G are attached; I, a shaft on which said disk is mounted; J, a bolt passing centrally through said shaft; K, a crank by which said shaft and the parts attached thereto are rotated, and L a hasp which holds the sides A A' together in the center.

The frame parts A A' are provided with grooves $a\,a'$, into which the edges of the sieve enter. These grooves start at or near the points where the parts A A', the ends B, and the sieve are nearest together or in contact, and increase in depth until they reach the center, where they should each be about one-sixteenth of an inch deep, or deep enough to securely hold the sieve when the edges are inserted therein.

The sieve D is preferably formed with overlapping edges of sheet metal $d$, and just wide enough to slip between the sides A A'. When it is in place the sides are squeezed toward each other, which causes the edges of the sieve to enter the grooves $a\,a'$, and are secured in position by the hasp L, or other equivalent device.

The hopper E is secured to the front frame part, A, in the manner shown, and (said frame part having a large portion of its center cut away) conducts the flour, meal, or whatever is to be sifted to the center of the sieve, where it can be operated upon by the brushes and thus sifted.

The brushes F are mounted on the shanks G, which are slotted and attached to the disk H by screws $g$, which pass through said slots, whereby said shanks and the brushes thereon are rendered adjustable. The brushes may thus be caused to bear more or less forcibly against the sieve, and thus cause the flour or other material to be sifted more or less rapidly. Pins $h$ prevent the shanks G from turning out of position.

As will be seen most plainly in Figs. 3 and 5, (particularly Fig. 5,) the rotary structure is all mounted upon the short shaft I, which rests solely in a bearing in the frame part A'. By means of the bolt J and the nut $j$ the disk H may be drawn more or less tightly against the frame part A', and thus maintain any desired pressure notwithstanding any variation of the parts either by the usual wear or by shrinking and swelling of the wood portions. As the shaft has but one bearing this is necessary in order to maintain a steady and even motion, and an equal pressure of the brushes on the sieve.

Having thus fully described my said invention, what I claim as new, and desire to secure by Letters Patent, is—

1. In a rotary sieve, the combination of the brushes F, shanks G, disk H, short shaft I, adjusting-bolt J, and crank K, substantially as specified.

2. The combination, in a rotary sieve, of the shanks G, carrying the brushes, said shanks having slots therein, screws $g$, pins $h$, and the disk H, all substantially as shown and described, and for the purposes specified.

In witness whereof I have hereunto set my hand and seal at Indianapolis, Indiana, this 11th day of November, A. D. 1881.

WILLIAM L. HEUSER. [L. S.]

In presence of—
C. BRADFORD,
CHAS. L. THURBER.